United States Patent
Terauchi et al.

(10) Patent No.: US 6,850,268 B1
(45) Date of Patent: Feb. 1, 2005

(54) APPARATUS FOR DETECTING PASSENGER OCCUPANCY OF VEHICLE

(75) Inventors: Akira Terauchi, Saitama (JP); Masayuki Habaguchi, Saitama (JP); Hiromitsu Yuhara, Saitama (JP); Masakazu Saka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/396,269

(22) Filed: Sep. 15, 1999

(30) Foreign Application Priority Data

Sep. 25, 1998 (JP) .......................................... 10-271066

(51) Int. Cl.[7] ................................................ H04N 7/18
(52) U.S. Cl. ................................... 348/148; 348/399.1
(58) Field of Search ................................ 348/143, 148,
348/149, 153, 159, 161, 169, 119, 47, 43,
399.1, 414.1; 382/104, 100, 41; 340/937;
250/342, 201; 375/240.08

(56) References Cited

U.S. PATENT DOCUMENTS

| | | | | |
|---|---|---|---|---|
| 5,003,166 A | * | 3/1991 | Girod ........................ 250/201.4 |
| 5,193,124 A | * | 3/1993 | Subbarao ..................... 382/255 |
| 5,642,299 A | * | 6/1997 | Hardin et al. ................. 364/561 |
| 5,653,462 A | * | 8/1997 | Breed et al. .................. 280/735 |
| 5,699,057 A | * | 12/1997 | Ikeda et al. ................... 340/937 |
| 5,703,367 A | * | 12/1997 | Hashimoto et al. .......... 250/342 |
| 5,802,479 A | * | 9/1998 | Kithil et al. .................... 701/45 |
| 5,835,613 A | * | 11/1998 | Breed et al. ................. 382/100 |
| 5,915,033 A | * | 6/1999 | Tanigawa et al. ........... 382/106 |
| 5,959,672 A | * | 9/1999 | Sasaki .................... 375/240.23 |
| 6,067,147 A | * | 5/2000 | Hirabayashi et al. ....... 356/3.14 |
| 6,215,516 B1 | * | 4/2001 | Ma et al. ....................... 348/43 |
| 6,285,393 B1 | * | 9/2001 | Shimoura et al. ........... 348/119 |
| 6,459,973 B1 | * | 10/2002 | Breed et al. ................... 701/45 |
| 6,507,359 B1 | * | 1/2003 | Muramoto et al. ........... 348/47 |

FOREIGN PATENT DOCUMENTS

| | | | | |
|---|---|---|---|---|
| JP | 311105/1988 | 12/1988 | ........... G01B/11/00 |
| JP | 169289/1996 | 7/1996 | ........... B60R/21/02 |
| JP | 10-35406 | 2/1998 | |
| JP | 10-119715 | 5/1998 | |
| JP | 10-250450 | 9/1998 | |

* cited by examiner

*Primary Examiner*—Gims Philippe
*Assistant Examiner*—Behrooz Senfi
(74) *Attorney, Agent, or Firm*—Lahive & Cockfield, LLP; Anthony A. Laurentano, Esq.

(57) ABSTRACT

An apparatus for detecting the passenger occupancy of a vehicle includes, at least two image pickup sections provided at a specified distance, a measuring section measuring a distance to an object on the basis of the at least two images acquired by the at least two image pickup sections, a reference data providing section providing reference data relating to the distance from the image pickup sections to a seat in accordance with the position of the seat, and a detection section detecting the passenger occupancy of the seat on the basis of the distance measured by the measuring section and the reference data.

9 Claims, 7 Drawing Sheets

APPARATUS FOR DETECTING PASSENGER OCCUPANCY OF VEHICLE

BACKGROUND OF THE INVENTION

1. Field of the Invention

The present invention relates to an apparatus that is installed on automobiles and other vehicles for detecting their passenger occupancy or the physique of passengers.

2. Description of the Related Art

In view of enhancing the safety and comfort of vehicles, it has recently been proposed that the passenger occupancy of vehicles and the physique of passengers are detected and control is performed in accordance with the obtained information. A typical example of this approach is the control of an air bag device that is installed on a vehicle and activated upon crash. The air bag device is required to operate optimally in accordance with the presence or absence of a passenger or the physique of any passenger (e.g. whether the passenger is an adult or a child).

Japanese Patent Unexamined Publication (kokai) No. 169289/1996 describes an apparatus that detects the passenger occupancy of a vehicle and the seating poisture of passengers. The apparatus is composed a seat position sensor that detects the position of a seat relative to the vehicle and which outputs the relevant information about the seat position and a distance sensor that is installed on the vehicle and which detects the distance to the passenger on the seat. The apparatus checks if any passenger rests on the seat on the basis of the acquired seat position information and distance information. The distance sensor projects infrared rays onto a predetermined point on a passenger, receives the reflection from the passenger and measures the distance to the passenger on the basis of the time over which the light travels to and back from the passenger or the deviation in the wavelength of the light or the incident angle of the reflected light.

Japanese Patent Unexamined Publication (kokai) No. 311105/1988 describes a method of detecting driver's sleeping while driving by first taking the image of the driver's face, then detecting the position of his nose from the image data and finally detecting the positions of his eyes. To detect the nose position, the degree of correlation between a preliminarily constructed standard pattern and the acquired image data is checked and the position of an image having a maximum degree of correlation is used as a basis.

The apparatus described in Japanese Patent Unexamined Publication (kokai) No. 169289/1996 relies on the distance sensor to measure a single point on a passenger and, hence, often fails to achieve correct measurement of the single point if there are disturbances and other undesirable effects. In other words, the precision in the measurement of the distance to the passenger is not high. The method described in Japanese patent Unexamined Publication (kokai) No. 311105/1988 is for detecting driver's sleeping while driving and not for detecting the passenger occupancy of a vehicle or the physique of passengers.

SUMMARY OF THE INVENTION

An object, therefore, of the present invention is to provide an apparatus that can detect the passenger occupancy of a vehicle or the physique of passengers with high reliability.

The stated object of the invention can be attained by the apparatus for detecting the passenger occupancy of a vehicle that includes at least two image pickup sections provided at a specified distance apart, a measuring section measuring the distance to an object on the basis of the at least two images acquired by the at least two sections, a reference data providing section providing reference data about the distance from the image pickup section to a seat in accordance with the position of the seat, and a detection section detecting the passenger occupancy of a vehicle on the basis of the distance measured by the measuring section and the reference data.

According to this apparatus, the distance from the image pickup section to a passenger is measured by a method relying upon the theory of triangulation using at least two image pickup sections. Thus, the passenger occupancy of a vehicle is detected on the basis of the reference data relating to the distance to the seat and the measured distance to the passenger. This enables the passenger occupancy of a vehicle to be detected in the correct way.

In the above apparatus, the images may be each divided into a plurality of small areas, the measuring section may measure the distance to the object for each of the small areas, and the detection section may determine if any part of the object exists in each of said small areas and integrates the results of such determination for all of said small areas to determine if any passenger exists or evaluate the physique of a passenger if any exists.

According to this apparatus, each of the images taken is divided into a plurality of small areas and determination is made to see if any part of the object exists in each of these small areas and the results of such checks are integrated to determine if any passenger exists in the vehicle or evaluate the physique of a passenger if any exists. This enables the determination or evaluation to be carried out correctly. Even if disturbances occur in part of the images, they will not affect the accuracy of the overall judgment. Hence, the detection apparatus is highly immune to disturbances.

DETAILED DESCRIPTION OF THE PREFERRED EMBODIMENTS

Figure 1:
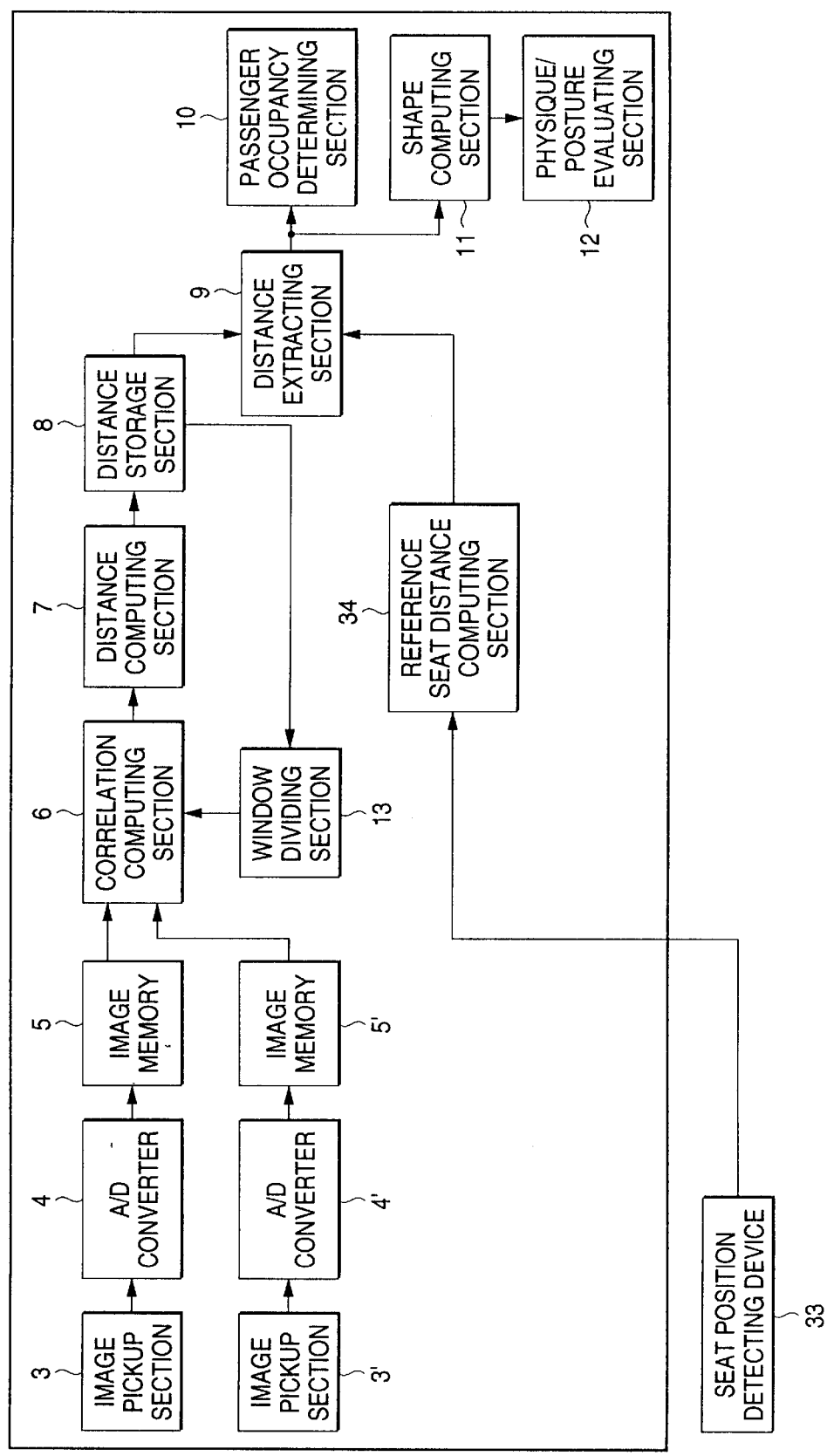
FIG. 1 is a block diagram showing the general layout of a detecting apparatus according to an embodiment of the invention.
Figure 2:
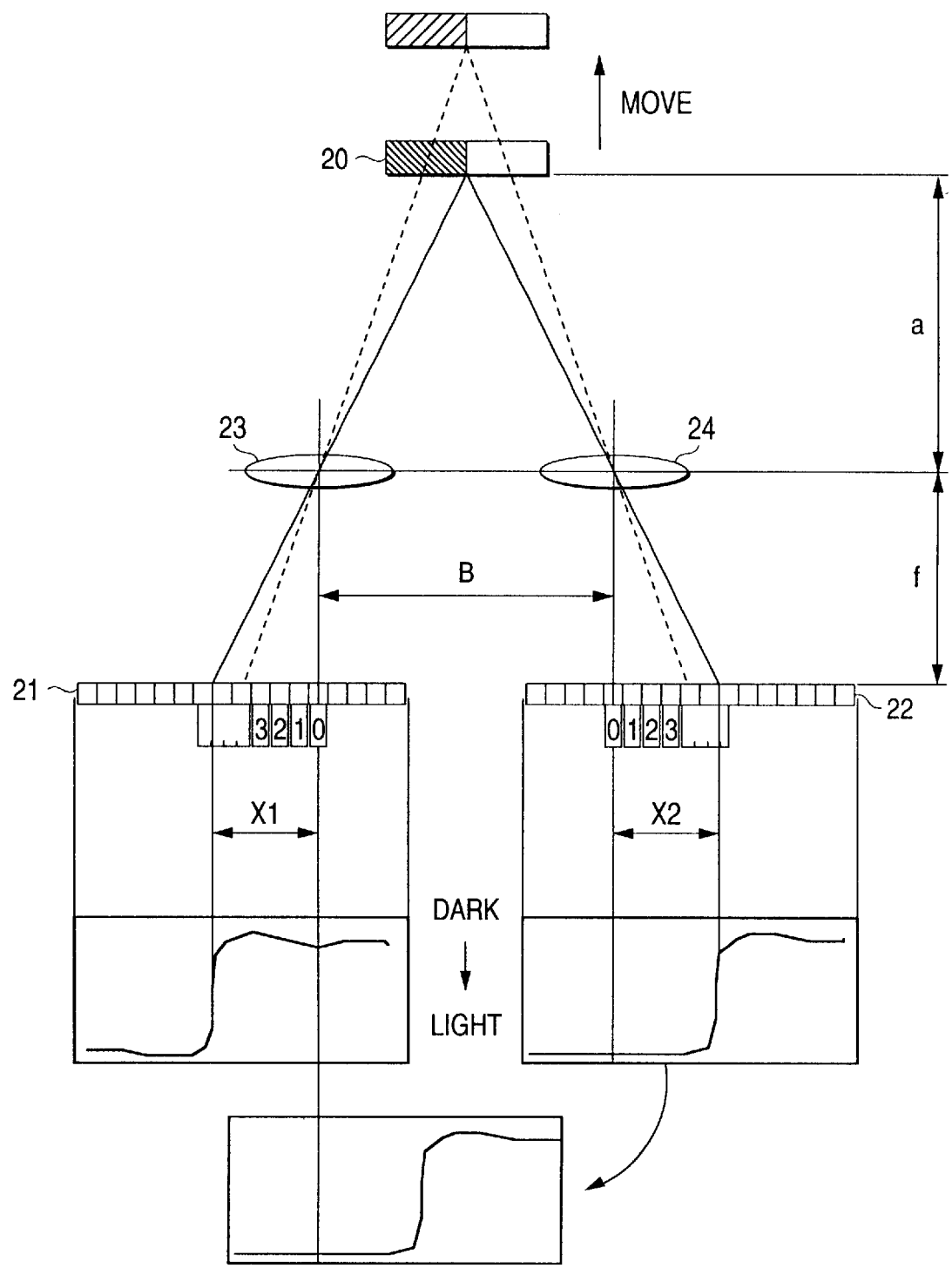
FIG. 2 is a diagram showing the principles of distance measurement by triangulation.

A description will be given of an embodiment of the invention with reference to the accompanying drawings. FIG. 1 is a block diagram showing the general layout of a passenger detecting apparatus according to an example of the invention. FIG. 2 is a sketch illustrating the theory of distance measurement by triangulation that is used in the example. First, with reference to FIG. 2, a description will be given of how distance can be measured using a pair of image pickup devices.

While a pair of image pickup devices are used in the invention, one device is composed of a line sensor 21 and a lens 23 and the other device is composed of a line sensor 22 and a lens 24. The tow image pickup devices are disposed sidewise or vertically apart from each other with a space by a predetermined distance, that is, a baseline length B. The line sensors 21 and 22 are typically a one-dimensional CCD and may be an array of photosensors arranged in a line. To permit use at night, image pickup devices using infrared radiation are preferred. To give an exemplary setup, an infrared-transparent filter is placed in front of the lenses 23 and 24, an object 20 is illuminated periodically with an infrared light source and the reflected infrared light from the object 20 is sensed with the line sensors 21 and 22.

The line sensors 21 and 22 are positioned at the focal length f of the lenses 23 and 24, respectively. Suppose here that the object is at distance a from the plane in which the lenses 23 and 24 lie. Also suppose that the line sensor 21 forms the image of this object in a position offset by X1 from the optical axis of the lens 23 whereas the line sensor 22 forms the image in a position offset by X2 from the optical axis of the lens 24. According to the theory of triangulation, the distance a from the plane of the lens 23 or 24 to the object 20 is determined by $a=B\cdot f/(X1+X2)$.

In the embodiment, since images are digitized, the distance (X1+X2) is calculated digitally. While shifting one or both of the images obtained by the line sensors 21 and 22, the sum of the absolute values of the difference between the digital values representing luminance of corresponding pixels in the two images is determined and let the sum be a value of correlation. The amount of image shift that provides a minimum value of correlation represents the positional offset between the two images, namely, (X1+X2). Theoretically, (X1+X2) represents the distance over which the two images obtained by the line sensors 21 and 22 need to be moved relative to each other in order to superpose them as shown in FIG. 2.

For the sake of simplicity, the foregoing description assumes that the image pickup devices are one-dimensional line sensors 21 and 22. In fact, however, as described below, two-dimensional CCD or two-dimensional photosensor array is used as the image pickup device in the embodiment of the invention. In this case, the two-dimensional images obtained from the two image pickup devices are shifted relative to each other and calculations for correlation are performed in the same manner as described above. The amount of shift that provides a minimum value of correlation corresponds to (X1+X2).

Figure 3:
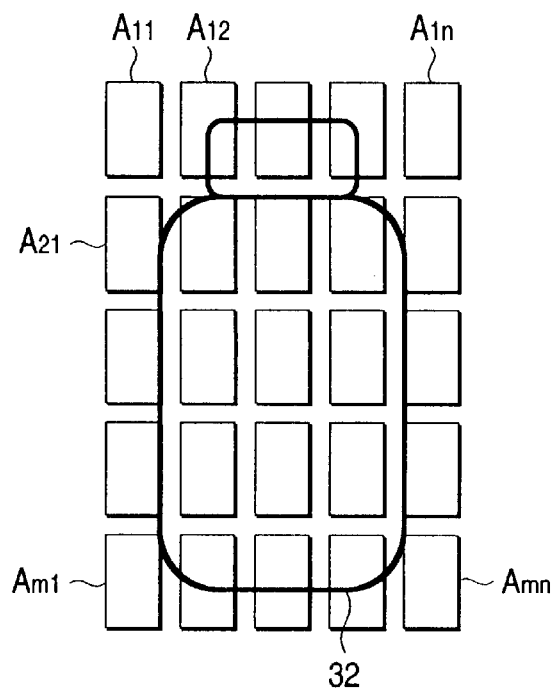
FIG. 3 is a view showing small areas (windows) into which an image is divided for distance measurement.

The image pickup section 3 shown in FIG. 1 corresponds to one of the two image pickup sections including the lens 23 and the line sensor 21 shown in FIG. 2 whereas the image pickup section 3' corresponds to the other image pickup section including the lens 24 and the line sensor 22 also shown in FIG. 2. In the embodiment, an imaged area is divided into a plurality of small areas (windows) $A_{11}$, $A_{12}$, ... $A_{mn}$ and distance measurement is performed for each window, thus requiring a two-dimensional image of the whole object. To meet this need, each of the image pickup sections 3 and 3' is composed of a two-dimensional CCD or photosensor array. FIG. 3 shows the relative positions of an image pickup device 30 and a vehicular seat as its back 32 is seen from the front of the vehicle.

The image of the object taken with the image pickup sections 3 and 3' is sent to analog/digital converters (A/D converters) 4 and 4' where it is converted to digital data, which is then stored in image memories 5 and 5'. A portion of the image that corresponds to window $A_{11}$ is cut from each of the image memories 5 and 5' with a window cutting section 13. The image thereof is sent to a correlation computing section 6. In the correlation computing section 6, the calculation for correlation is performed which shifting the two cut portions of the image by specified amounts of a unit, and the amount of shift that provides a minimum value of correlation is (X1+X2). The thus determined value of (X1+X2) is sent from the correlation computing section 6 to a distance computing section 7.

Using the aforementioned equation $a=B\cdot f(X1+X2)$, the distance computing section 7 determines the distance $a_{11}$ to the object in the window $A_{11}$. The thus determined distance $a_{11}$ is stored in a distance storage section 8. The same procedure of calculation is executed for all windows in succession and distances $a_{11}$, $a_{12}$, ... $a_{mn}$ are stored in the distance storage section 8.

The resolution of the image data used in these calculations for correlation is determined by the pitch of the elements in the image pickup array. If a light-receiving array such as a photosensor array that has a comparatively large pitch between elements is used, it is preferable that the density of the image data is enhanced by performing calculations for interpolation between pitches and the calculations for correlation are performed on the image data thus increased in density.

In order to compensate for the change that occurs in the characteristics of the image pickup array due to temperature, a temperature sensor may be provided near the image pickup array so that the calculation of distance is compensated on the basis of the temperature information supplied from the temperature sensor.

Figure 4:
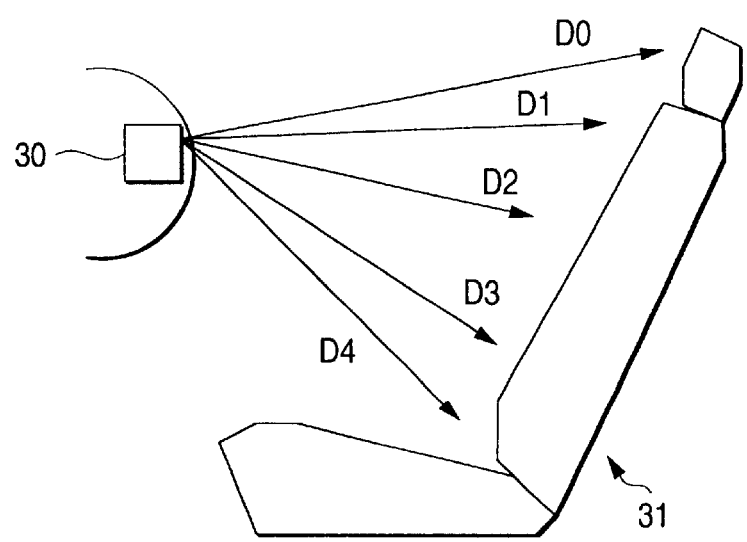
FIG. 4 is a view showing an exemplary method of computing the reference seat distance.

Next, a calculation of a reference seat distance compared with the above calculated distance will be now described with reference to FIG. 4. Let the distance from the image pickup device 30 to an unoccupied seat 31 be called a reference seat distance. The reference seat distance varies in accordance with the position of a seat that is slidable back and forth and the variable reclining angle of the back of the seat. In Japanese Patent Unexamined Publication (kokai) No. 311105/1988 described the above, a device detecting the amount of sliding of the seat with a variable resistor and a device detecting the reclining angle of the back of the seat with a variable resistor are provided, a technique of calculating the distance between the sleep detecting apparatus and a seat on the basis of the amount of sliding of the seat and the reclining angle is described. In the embodiment of the invention, this known technique is employed to calculate the distance to each of the portions of the seat that correspond to windows $A_{11}$, $A_{12}$, ... $A_{mn}$ on the basis of the amount of sliding of the seat and its reclining angle.

Referring to FIG. 1, a seat position detecting device 33 detects the amount of sliding of a seat and its reclining angle and a reference seat distance computing section 34 calculates the distance to the seat.

The technique described in Unexamined Published Japanese Patent Application (kokai) No. 311105/1088, may be replaced by the following more advantageous method: in a condition that there is no passenger in the vehicle, the position and reclining angle of a seat are changed to take various values; on the basis of the image taken by the image pickup sections 3 and 3' at each of these values, the distance to the seat is calculated by triangulation for each window. And, the data on seat distance at all values of the seat position and its reclining angle is accumulated; the data is then stored as a look-up table in a memory. In the vehicle running state, the amount of sliding of a seat and its reclining angle are detected with the seat position detecting device 33, and the reference seat distance for each window is read from the memory on the basis of the thus detected amount of seat sliding and its reclining angle.

To construct the data relating to the reference seat distance, measurement may be performed on the basis of the image data from the image pickup sections 3 and 3' for the combinations of all values of sliding position and reclining angle. Alternatively, distance may be measured for the combinations of representative values of sliding position and reclining angle and the data for the combinations of other values may be taken by interpolation. In this case, saving on memory capacity can be accomplished by storing in the memory with only the data that is obtained by actual measurement from the image data and interpolating the data when the date is used.

A distance extracting section 9 not only reads the measured distance a from the distance storage section 8 for each window but also reads the reference seat distance from the reference seat distance computing section 34 for the same window. If the measured distance a for a certain window is greater than the reference seat distance for the same window minus a slight error in measurement, no object lies between the seat and the image pickup sections. Then, "1" is added to the first counter $N_0$.

If the measured distance a for a certain window is equal to or smaller than the reference seat distance for the same window minus the body thickness of a passenger plus an error in measurement, the object lies between the seat and the image pickup sections. Then, "1" is added to the second counter $N_1$.

This comparison between the measured distance a and the reference seat distance is performed for all windows. If the resulting value of the counter $N_1$ is greater than a predetermined threshold value, the detecting device concludes that a passenger is in the vehicle. If it is equal to or smaller than the threshold value, no passenger is the conclusion. Alternatively, the ratio between the values of counters $N_1$ and $N_0$ may be taken and the detecting device concludes that a passenger is in the vehicle if the ratio is greater than a specified value.

Figure 5:
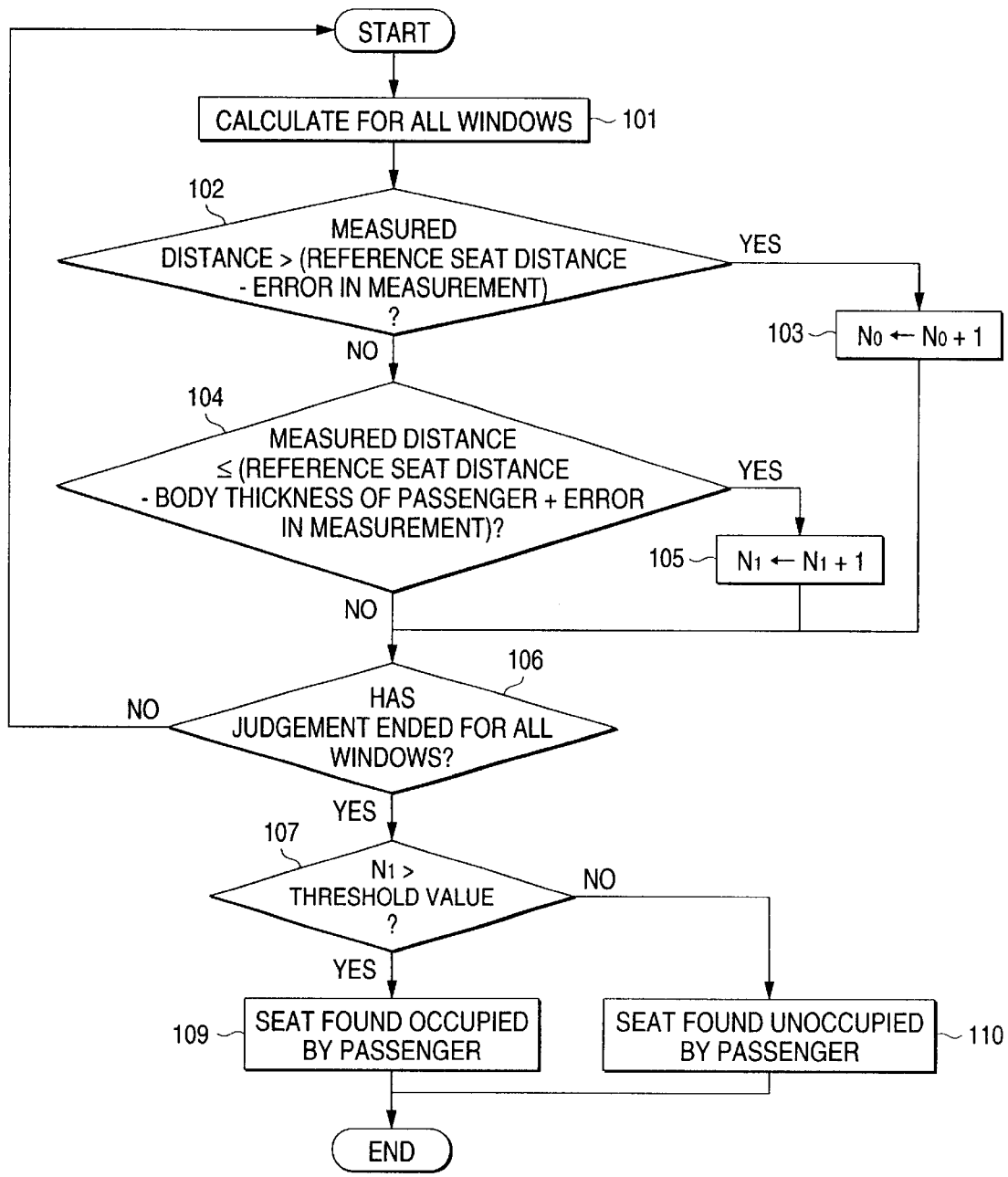
FIG. 5 is a flowchart showing a process of determining if there is a passenger in a seat.

FIG. 5 is a flowchart for the steps in processing according to the embodiment of the invention. First, the measured distance for each window that is stored in the distance storage section 8 is compared with the reference seat distance for the same window as obtained from the reference seat distance computing section 34 (step 102). If the measured distance is greater than the reference seat distance minus an error in measurement, "1" is added to the first counter $N_1$ (step 103). If it is smaller than the reference seat distance minus the body thickness of a passenger plus an error in measurement, "1" is added to the second counter $N_1$ (step 105). This treatment is made for all windows (steps 101 and 106) and if the value of counter $N_1$ at the end of the treatment is greater than a constant "1" (step 107), the detecting device concludes that a passenger is in the vehicle (step 109); if it is equal to or smaller than the constant "1", no passenger is the conclusion (step 110).

Figure 6:
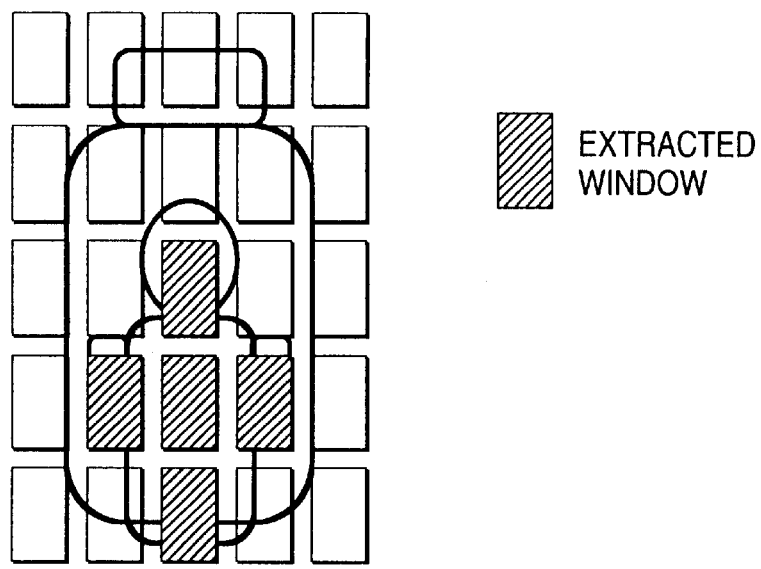
FIG. 6 is a view showing the relationship between a passenger and extracted windows.
Figure 7:
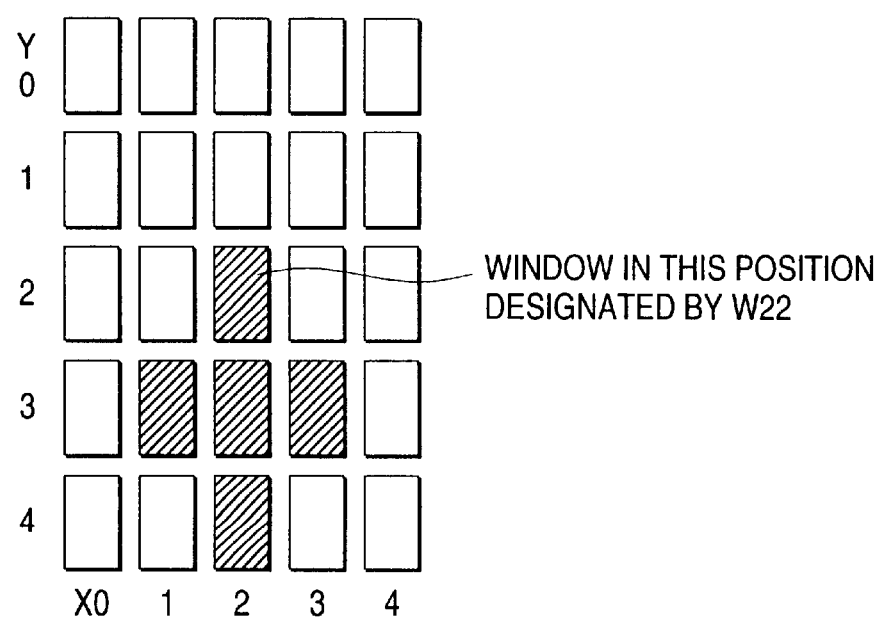
FIG. 7 is a view designating extracted windows by XY coordinates.

We now refer to FIGS. 6 and 7 in describing how to detect the physique of a passenger. In a distance extracting section 9 shown in FIG. 1, the measured distance for each window and the reference seat distance for the same window are extracted and compared with each other. Thus, a plurality of windows are classified into two groups, one consisting of windows showing a part of a passenger and the other consisting of windows showing no passenger. In FIG. 6, the windows found to contain part of a passenger are hatched and those found to contain no passenger are left blank. These windows are represented by XY coordinates in FIG. 7, in which each window is designated as Wxy, with the X and Y axes representing the horizontal and vertical directions, respectively.

Figure 8:
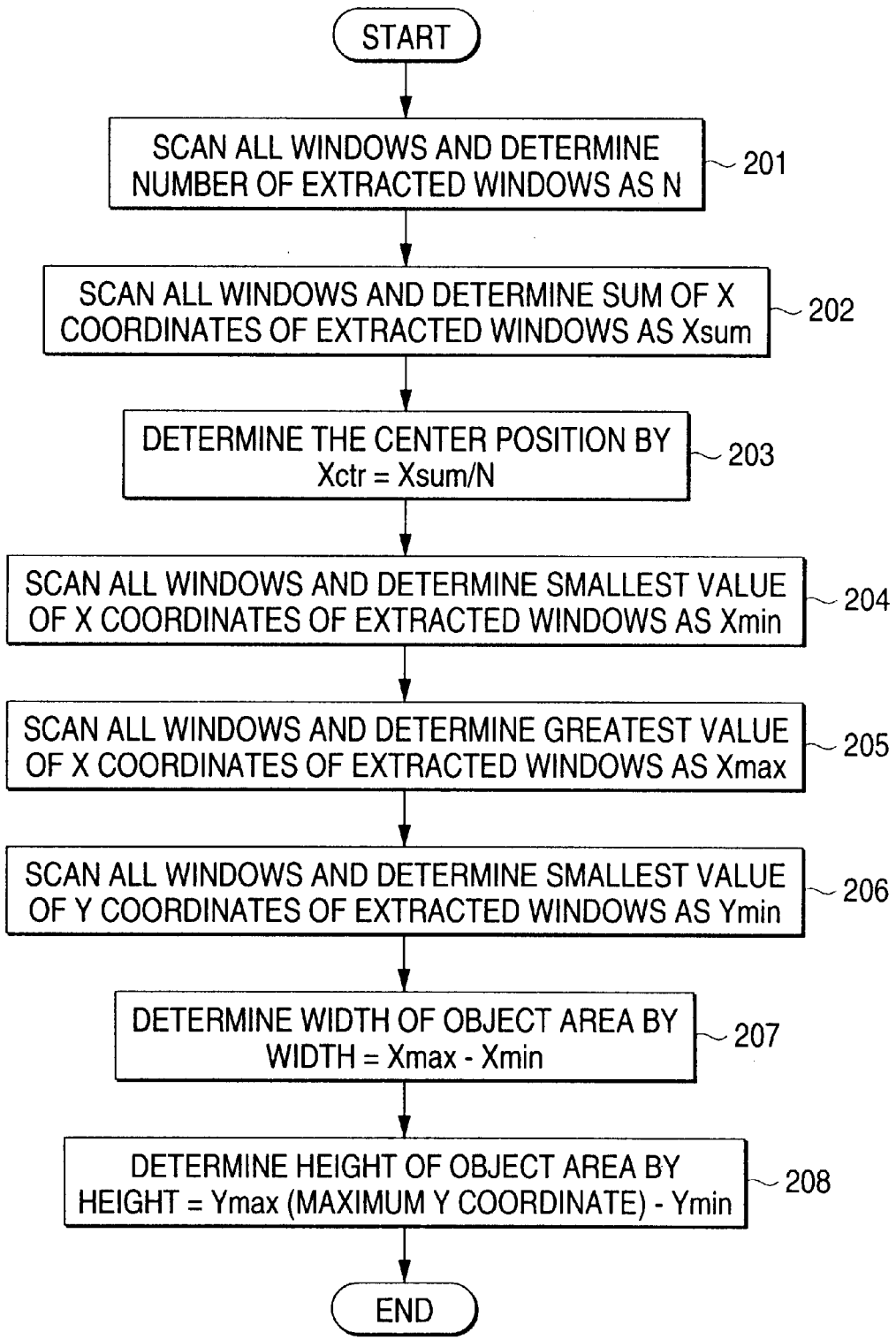
FIG. 8 is a flowchart for the steps in a shape computing process.

FIG. 8 shows a process by which the geometric elements of hatched windows such as center position, width and height are calculated by a shape computing section 11 shown in FIG. 1. First, all windows are scanned to determine the number of extracted (hatched) windows N (step 201). All windows are also scanned to determine the sum of the X coordinates of the extracted windows Xsum (step 202). The center position of a passenger Xctr can be determined by Xctr=Xsum/N (step 203).

In addition, all windows are scanned to determine Xmin which is the smallest of the X coordinates of the extracted windows (step 204), Xmax which is the greatest of their X coordinates (step 205), and Ymin which is the smallest of the Y coordinates of the extracted windows (step 206). Given these values, the width of the region to be analyzed (Width) is determined by Width=Xmax−Xmin (step 207) and the height of the same region (Height) is determinedbyHeight= Ymax (maximum Y coordinate)−Ymin (step 208).

Figure 9:
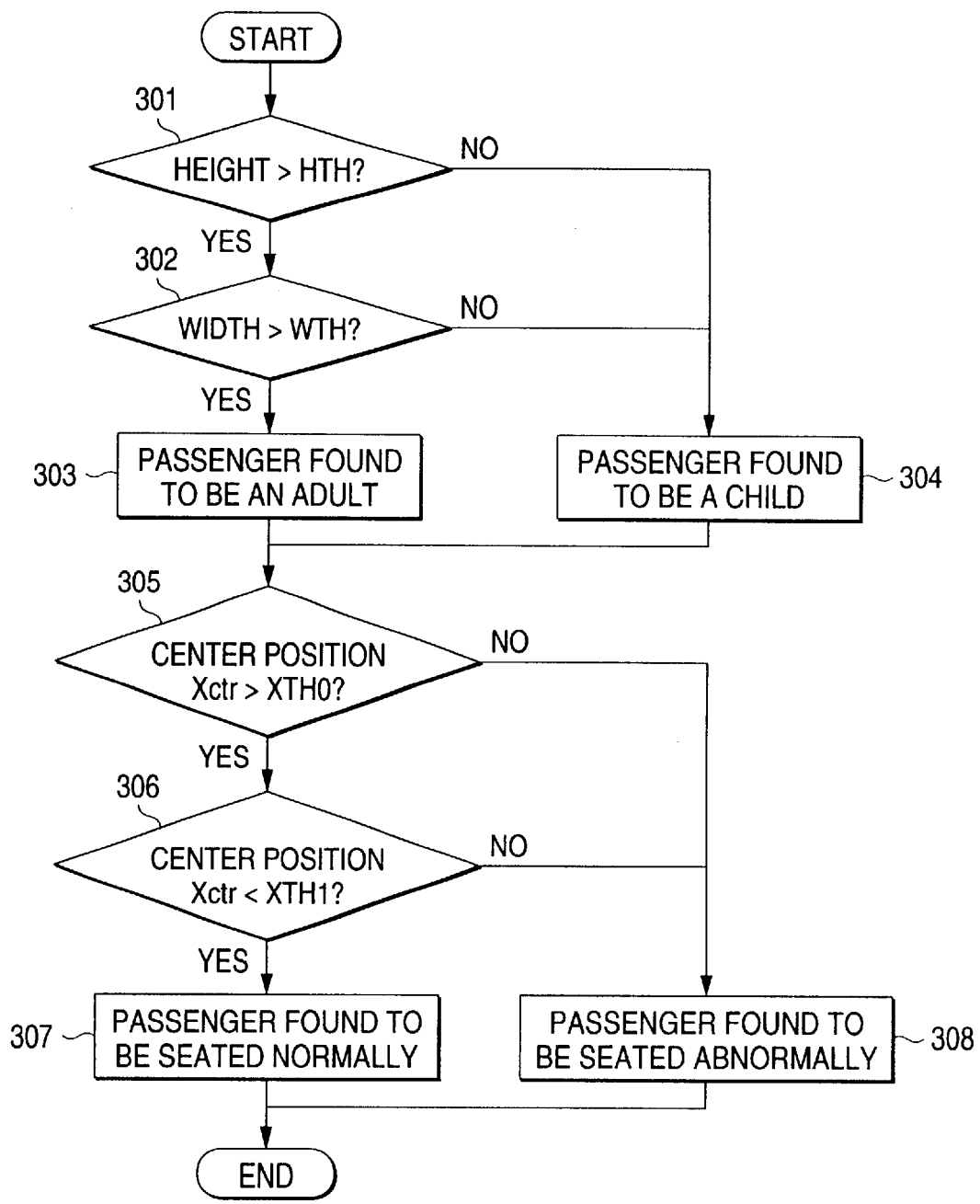
FIG. 9 is a flowchart for the steps in a physique/posture evaluating process.

We now describe the function of a physique/posture evaluating section 12 (see FIG. 1) with reference to the flowchart in FIG. 9. If the height of the passenger as determined in the shape computing section 11 is greater than a specified threshold Hth (step 301) and if the width of the passenger also determined in the shape computing section 11 is greater than a threshold Wth (step 302), the detecting device concludes that the passenger is an adult (step 303); otherwise, the passenger is found to be a child (step 304).

If the lateral center position of the passenger Xctr is greater than a first threshold XthO (step 305) but smaller than a second threshold Xthl (step 306), namely, if Xctr is close to the center of the image, the detecting device concludes that the passenger is seated in the normal position (step 307); if Xctr is offset to either right or left, the passenger is found to be in an abnormal position leaning sideways (step 308).

If the measured distance is closer to the image pickup devices than the reference seat distance plus a value comparable to the body thickness of the passenger, the detecting device may conclude that the passenger is bending forward.

According to the detecting apparatus of the invention, the occupancy of a vehicle by passengers can be correctly detected. Further, each of the images taken is divided into a plurality of small areas and check is made to see if any part of the object exists in each of these small areas and the results of such checks are integrated to determine if any passenger exists in the vehicle or evaluate the physique of a passenger if any exists. This enables the determination or evaluation to be carried out correctly. Even if disturbances occur in part of the images, they will not affect the accuracy of the overall judgment. Hence, the passenger detecting apparatus is highly immune to disturbances.

The present disclosure relates to the subject matter contained in Japanese patent application No. Hei. 10-271066 filed on Sep. 25, 1998 which is expressly incorporated herein by reference in its entirety.

While only certain embodiments of the invention have been specifically described herein, it will apparent that numerous modifications may be made thereto without departing from the spirit and scope of the invention.

What is claimed is:

1. An apparatus for detecting the passenger occupancy of a vehicle comprising:

a first image pickup means aligned along a first optical axis with a first lens, a second image pickup means aligned along a second optical axis with a second lens, the first and second image pickup means provided at a specified distance apart in a plane substantially perpendicular to the first and second optical axes, the respective optical axes of each image pickup means are substantially parallel to each other;

measuring means for dividing at least two images acquired by said first and second image pickup means into a plurality of small areas respectively, each of the plurality of small areas containing a plurality of pixels, and measuring a distance to an object in each of the small areas on the basis of an offset amount of an object image from one of the respective optical axes to determine a positional offset between the two images obtained in the respective small areas;

reference data providing means for providing reference data for each of the small areas relating to the distance from said first and second image pickup means to a seat in accordance with a position of said seat and a reclining angle of said seat;

detection means for detecting the passenger occupancy of said seat on the basis of the distance measured by said measuring means and said reference data;

a shape computing section for calculating a shape of the object on the basis of the positions of said small areas in which part of the object exists;

wherein an area provided by the at least two image pickup means is a seat back of a seat of the vehicle as seen from a view facing a front portion of the vehicle; and wherein said detection means determines if the part of the object exists in each of said small areas and integrates the results of such determination for all of said small areas and when the number of said small areas in which the part of the object exists is greater than a predetermined threshold value, said detection means determines that a passenger exists in the seat, and wherein it is judged that the passenger is an adult or child on the basis of the width and the height of the calculated shape.

2. An apparatus for detecting the passenger occupancy of a vehicle comprising:

a first image pickup means aligned along a first optical axis with a first lens, a second image pickup means aligned along a second optical axis with a second lens, the first and second image pickup means provided at a specified distance apart in a plane substantially perpendicular to the first and second optical axes, the respective optical axes of each image pickup means are substantially parallel to each other;

measuring means for dividing at least two images acquired by said first and second image pickup means into a plurality of small areas respectively, each of the plurality of small areas containing a plurality of pixels, and measuring a distance to an object in each of the small areas on the basis of an offset amount of an object image from one of the respective optical axes to determine a positional offset between the two images obtained in the respective small areas;

reference data providing means for providing reference data for each of the small areas relating to the distance from said first and second image pickup means to a seat in accordance with a position of said seat and a reclining angle of said seat;

detection means for detecting the passenger occupancy of said seat on the basis of the distance measured by said measuring means and said reference data; wherein an area provided by the at least two image pickup means is a seat back of a seat of the vehicle as seen from a view facing a front portion of the vehicle;

a shape computing section for calculating a shape of the object on the basis of the positions of said small areas in which part of the object exists; and wherein, said detection means determines if the part of the object exists in each of said small areas and integrates the results of such determination for all of said small areas; and when a ratio of the number of said small areas in which the part of the object exists, with respect to the total number of the small areas is greater than a predetermined threshold value, said detection means determines that a passenger exists in the seat, and wherein it is judged that the passenger is an adult or child on the basis of the width and the height of the calculated shape.

3. A method for detecting a passenger occupancy of a vehicle, the method comprising the steps of:

aligning at least two image pickup means at a specified distance apart in a common plane such that respective optical axes are substantially parallel to each other and are substantially perpendicular to said common plane;

dividing at least two images acquired by said at least two image pickup means into a plurality of small areas respectively;

measuring a distance to an object in each of the small areas on the basis of an offset amount of an object image from an optical axis of one of the image pickup means to determine a positional offset between the two images obtained in the respective small areas;

providing reference data for each of the small areas relating to the distance from said image pickup means to a seat in accordance with the position of said seat and a reclining angle of said seat;

detecting the passenger occupancy of said seat based on a distance measured by said measuring a distance to the object in each of the small areas on the basis of the offset amount of the object image between the two images obtained in the respective small areas and said provided reference data to determine if a part of the object exists in each of said small areas and integrate a result of such a determination for all of said small areas;

calculating a shape of the object based on the positions of said small areas in which part of the object exists;

wherein, when the number of said small areas in which the part of the object exists is greater than a predetermined threshold value, said step of detecting determines that a passenger exists in the seat;

wherein it is judged that the passenger is an adult or child on the basis of the width and the height of the calculated shape, and wherein an area provided by the at least two image pickup means is a seat back of a seat of the vehicle as seen from a view facing a front portion of the vehicle.

4. A method for detecting a passenger occupancy of a vehicle, the method comprising the steps of;
- aligning at least two image pickup means at a specified distance apart in a common plane such that respective optical axes are substantially parallel to each other and are substantially perpendicular to said common plane;
- dividing at least two images acquired by said at least two image pickup means into a plurality of small areas respectively;
- measuring a distance to an object in each of the small areas on the basis of an offset amount of an object image from an optical axis of one of the image pickup means to determine a positional offset between the two images obtained in the respective small areas;
- providing reference data for each of the small areas relating to the distance from said image pickup means to a seat in accordance with the position of said seat and a reclining angle of said seat; and
- detecting the passenger occupancy of said seat based on a distance measured by said measuring a distance to the object in each of the small areas on the basis of the offset amount of the object image between the two images obtained in the respective small areas and said provided reference data:
- calculating a shape of the object based on the positions of said small areas in which part of the object exists;
- wherein said step of detecting the passenger occupancy of the seat determines if a part of the object exists in each of said small areas and integrates a result of such a determination for all of said small areas and when the ratio of the number of said small areas in which the part of the object exists, with respect to the total number of the small areas is greater than a predetermined threshold value, said step of detecting the passenger occupancy determines that a passenger exists in the seat;
- wherein it is judged that the passenger is an adult or child on the basis of the width and the height of the calculated shape; and
- wherein an area provided by the at least two image pickup means is a seat back of a seat of the vehicle as seen from a view facing a front portion of the vehicle.

5. The method for detecting the passenger occupancy of a vehicle according to claim 3, further comprising the step of, compensating for a change in a characteristic of the at least two image pickup means due to temperature.

6. An apparatus for detecting the passenger occupancy of a vehicle comprising:
- a first image pickup means aligned along a first optical axis with a first lens, a second image pickup means aligned along a second optical axis with a second lens, the first and second image pickup means provided at a specified distance apart in a plane substantially perpendicular to the first and second optical axes, the respective optical axes of each image pickup means are substantially parallel to each other;
- measuring means for dividing at least two images acquired by said first and second image pickup means into a plurality of small areas respectively, each of the plurality of small areas containing a plurality of pixels, and measuring a distance to an object in each of the small areas on the basis of an offset amount of an object image from one of the respective optical axes to determine a positional offset between the two images obtained in the respective small areas;
- reference data providing means for providing reference data for each of the small areas relating to the distance from said first and second image pickup means to a seat in accordance with a position of said seat and a reclining angle of said seat;
- detection means for detecting the passenger occupancy of said seat on the basis of the distance measured by said measuring means and said reference data; and
- a shape computing section for calculating a shape of the object on the basis of the positions of said small areas in which part of the object exists,
- wherein an area provided by the at least two image pickup means is a seat back of a seat of the vehicle as seen from a view facing a front portion of the vehicle;
- wherein said detection means determines if the part of the object exists in each of said small areas and integrates the results of such determination for all of said small areas and when the number of said small areas in which the part of the object exists is greater than a predetermined threshold value, said detection means determines that a passenger exists in the seat; and
- wherein it is judged that the passenger is seated at a normal position or abnormal position on the basis of a center position of the calculated shape.

7. An apparatus for detecting the passenger occupancy of a vehicle comprising:
- a first image pickup means aligned along a first optical axis with a first lens, a second image pickup means aligned along a second optical axis with a second lens, the first and second image pickup means provided at a specified distance apart in a plane substantially perpendicular to the first and second optical axes, the respective optical axes of each image pickup means are substantially parallel to each other;
- measuring means for dividing at least two images acquired by said first and second image pickup means into a plurality of small areas respectively, each of the plurality of small areas containing a plurality of pixels, and measuring a distance to an object in each of the small areas on the basis of an offset amount of an object image from one of the respective optical axes to determine a positional offset between the two images obtained in the respective small areas;
- reference data providing means for providing reference data for each of the small areas relating to the distance from said first and second image pickup means to a seat in accordance with a position of said seat and a reclining angle of said seat;
- detection means for detecting the passenger occupancy of said seat on the basis of the distance measured by said measuring means and said reference data;
- a shape computing section for calculating a shape of the object on the basis of the positions of said small areas in which part of the object exists;
- wherein an area provided by the at least two image pickup means is a seat back of a seat of the vehicle as seen from a view facing a front portion of the vehicle;
- wherein, said detection means determines if the part of the object exists in each of said small areas and integrates the results of such determination for all of said small areas and when the ratio of the number of said small areas in which the part of the object exists, with respect to the total number of the small areas is greater than a predetermined threshold value, said detection means determines that a passenger exists in the seat; and
- wherein it is judged that the passenger is seated at a normal position or abnormal position on the basis of a center position of the calculated shape.

8. A method for detecting a passenger occupancy of a vehicle, the method comprising the steps of:

aligning at least two image pickup means at a specified distance apart in a common plane such that respective optical axes are substantially parallel to each other and are substantially perpendicular to said common plane;

dividing at least two images acquired by said at least two image pickup means into a plurality of small areas respectively;

measuring a distance to an object in each of the small areas on the basis of an offset amount of an object image from an optical axis of one of the image pickup means to determine a positional offset between the two images obtained in the respective small areas;

providing reference data for each of the small areas relating to the distance from said image pickup means to a seat in accordance with the position of said seat and a reclining angle of said seat;

detecting the passenger occupancy of said seat based on a distance measured by said measuring a distance to the object in each of the small areas on the basis of the offset amount of the object image between the two images obtained in the respective small areas and said provided reference data to determine if a part of the object exists in each of said small areas and integrate a result of such a determination for all of said small areas;

calculating a shape of the object based on the positions of said small areas in which part of the object exists, wherein, when the number of said small areas in which the part of the object exists is greater than a predetermined threshold value, said step of detecting determines that a passenger exists in the seat;

wherein an area provided by the at least two image pickup means is a seat back of a seat of the vehicle as seen from a view facing a front portion of the vehicle; and wherein it is judged that the passenger is seated at a normal position or abnormal position on the basis of a center position of the calculated shape.

9. A method for detecting a passenger occupancy of a vehicle, the method comprising the steps of:

aligning at least two image pickup means at a specified distance apart in a common plane such that respective optical axes are substantially parallel to each other and are substantially perpendicular to said common plane;

dividing at least two images acquired by said at least two image pickup means into a plurality of small areas respectively;

measuring a distance to an object in each of the small areas on the basis of an offset amount of an object image from an optical axis of one of the image pickup means to determine a positional offset between the two images obtained in the respective small areas;

providing reference data for each of the small areas relating to the distance from said image pickup means to a seat in accordance with the position of said seat and a reclining angle of said seat;

detecting the passenger occupancy of said seat based on a distance measured by said measuring a distance to the object in each of the small areas on the basis of the offset amount of the object image between the two images obtained in the respective small areas and said provided reference data; and calculating a shape of the object based on the positions of said small areas in which part of the object exists;

wherein said step of detecting the passenger occupancy of the seat determines if a part of the object exists in each of said small areas and integrates a result of such a determination for all of said small areas and when the ratio of the number of said small areas in which the part of the object exists, with respect to the total number of the small areas is greater than a predetermined threshold value, said step of detecting the passenger occupancy determines that a passenger exists in the seat;

wherein an area provided by the at least two image pickup means is a seat back of a seat of the vehicle as seen from a view facing a front portion of the vehicle; and wherein it is judged that the passenger is seated at a normal position or abnormal position on the basis of a center position of the calculated shape.

* * * * *